United States Patent
Chapman et al.

(10) Patent No.: US 11,388,484 B2
(45) Date of Patent: *Jul. 12, 2022

(54) SECONDARY MEDIA INSERTION SYSTEMS, METHODS, AND APPARATUSES

(71) Applicant: Comcast Cable Communications, LLC, Philadelphia, PA (US)

(72) Inventors: Leslie Chapman, Philadelphia, PA (US); Barry Mcmillan, Philadelphia, PA (US); Leemay Nassery, Philadelphia, PA (US); Austin Wells, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,837

(22) Filed: Apr. 8, 2021

(65) Prior Publication Data

US 2021/0297725 A1    Sep. 23, 2021

Related U.S. Application Data

(63) Continuation of application No. 15/858,764, filed on Dec. 29, 2017, now Pat. No. 11,006,188.

(51) Int. Cl.
| | | |
|---|---|---|
| *H04N 21/431* | (2011.01) | |
| *H04N 21/81* | (2011.01) | |
| *H04N 21/472* | (2011.01) | |
| *H04N 21/235* | (2011.01) | |
| *H04N 21/258* | (2011.01) | |
| *H04N 21/6587* | (2011.01) | |
| *H04N 21/262* | (2011.01) | |
| *H04N 21/4725* | (2011.01) | |
| *H04N 21/433* | (2011.01) | |

(52) U.S. Cl.
CPC ......... *H04N 21/812* (2013.01); *H04N 21/235* (2013.01); *H04N 21/25891* (2013.01); *H04N 21/26258* (2013.01); *H04N 21/4316* (2013.01); *H04N 21/472* (2013.01); *H04N 21/4725* (2013.01); *H04N 21/47217* (2013.01); *H04N 21/6587* (2013.01); *H04N 21/433* (2013.01)

(58) Field of Classification Search
CPC ............... H04N 21/812; H04N 21/235; H04N 21/25891; H04N 21/26258; H04N 21/4316; H04N 21/472; H04N 21/47217; H04N 21/4725; H04N 21/6587; H04N 21/433

See application file for complete search history.

(56) References Cited

U.S. PATENT DOCUMENTS

| | | |
|---|---|---|
| 5,929,849 A | 7/1999 | Kikinis |
| 6,774,908 B2 | 8/2004 | Bates et al. |
| 2002/0124264 A1 | 9/2002 | Kikinis |
| 2003/0079224 A1 | 4/2003 | Komar et al. |

(Continued)

OTHER PUBLICATIONS

"Pop-Up Video", Wikipedia, retrieved Apr. 3, 2017 from <https://en.wikipedia.org/wiki/Pop-Up_Video>.

*Primary Examiner* — John R Schnurr
(74) *Attorney, Agent, or Firm* — Banner & Witcoff, Ltd.

(57) ABSTRACT

Systems, methods, and apparatuses for outputting secondary media assets are disclosed. One or more secondary media assets may be associated with objects already existing within a first media asset. The one or more secondary media assets may be indicated according to a manifest file and may be output during execution of a trick play command during output of the first media asset.

28 Claims, 10 Drawing Sheets

(56) References Cited

U.S. PATENT DOCUMENTS

| | | |
|---|---|---|
| 2007/0250775 A1 | 10/2007 | Marsico et al. |
| 2008/0307454 A1 | 12/2008 | Ahanger et al. |
| 2012/0218468 A1 | 8/2012 | Tan et al. |
| 2013/0036442 A1 | 2/2013 | Wingert |
| 2013/0276008 A1 | 10/2013 | Wu et al. |
| 2015/0058102 A1 | 2/2015 | Christensen et al. |
| 2015/0073919 A1 | 3/2015 | Spitz et al. |
| 2015/0350729 A1 | 12/2015 | Reynolds |
| 2015/0373295 A1 | 12/2015 | Outters |
| 2016/0094886 A1 | 3/2016 | Lian et al. |
| 2016/0173942 A1 | 6/2016 | Ransom et al. |
| 2017/0251278 A1 | 8/2017 | Cansler et al. |
| 2018/0048926 A1 | 2/2018 | Shusman |

SECONDARY MEDIA INSERTION SYSTEMS, METHODS, AND APPARATUSES

CROSS-REFERENCE TO RELATED APPLICATIONS

This application is a continuation of U.S. patent application Ser. No. 15/858,764, filed on Dec. 29, 2017, which is hereby incorporated by reference in its entirety.

BACKGROUND

Trick play commands enable users to manipulate digital media through commands such as pause, slow, rewind, fast-forward, etc. Users may fast-forward through particular media such as, for example, commercial advertisements. Such manipulation causes a user to avoid portions of the digital media (e.g., during rewind or fast-forward) or enables a user to focus on portions of the digital media (e.g., during pause or slow-motion).

SUMMARY

Methods, systems, and apparatuses are described for supplementing a first media asset, such as television content, movies, live events, online video, commercials, etc., with a secondary media asset, such as websites, trivia, general information, additional advertisements, applications, games, etc. A computing device may receive a trick play command during output of a first media asset. The trick play command may be a pause command, a slow command, a rewind command, a fast-forward command, etc. The computing device may also receive a timestamp associated with the trick play command. In response to receiving the trick play command, the computing device may search for one or more secondary media assets associated with a respective start time (corresponding to an on-screen appearance of an object of the first media asset) less than or equal to the timestamp and comprise a respective end time (corresponding to the object of the first media asset disappearing from on-screen) greater than or equal to the timestamp.

The computing device may retrieve, for each of the determined one or more content descriptors, respective secondary media assets and respective spatial location information associated with the first media asset at the timestamp. The computing device may output, during execution of the trick play command, the respective secondary media assets and the first media asset. The outputting may comprise positioning, based on respective spatial location information, the respective secondary media assets adjacent to objects within the first media asset.

This summary is not intended to identify critical or essential features of the disclosures herein, but instead merely summarizes certain features and variations thereof. Other details and features are also disclosed herein.

BRIEF DESCRIPTION OF THE DRAWINGS

Some features herein are shown by way of example, and not by way of limitation, in the figures of the accompanying drawings and in which like reference numerals refer to similar elements.

DETAILED DESCRIPTION

Figure 1:
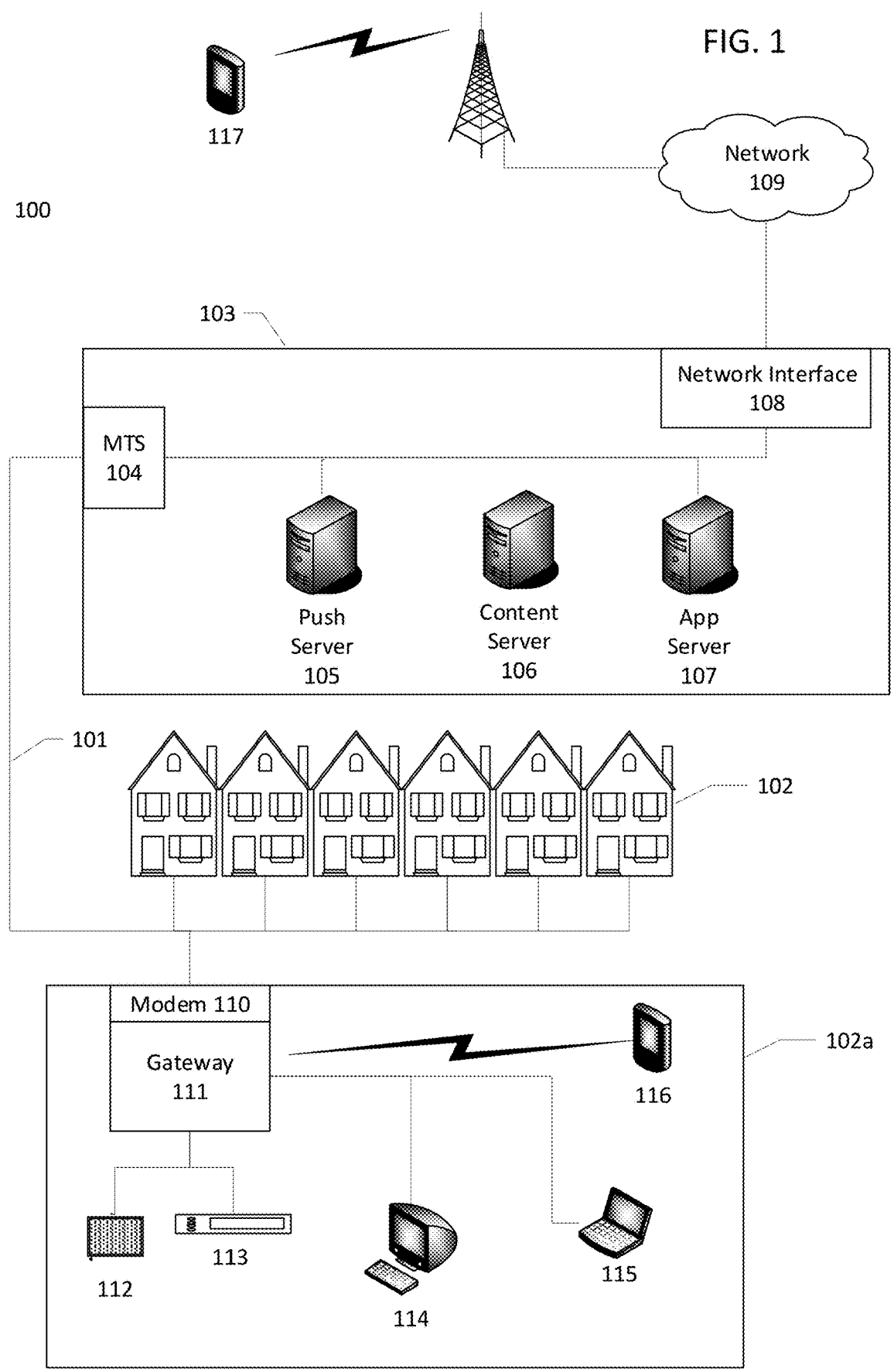
FIG. 1 is an example information distribution network.

Systems, apparatuses, and methods for overlaying a secondary media asset during operation of trick play commands in connection with the playback of a first media asset are described. The first media asset or the secondary media asset may be content associated with a video service network, such as a cable television network. However, the first media asset or the secondary media asset may comprise other forms of content, including audio content, video content, and multimedia content, and in connection with any number of delivery mechanisms for such content, including video networks, media delivered via the Internet or another information network, media stored on any digital medium, including, but not limited to, DVDs, CDs, solid-state memory, and hard disk drives such as found in computers and DVRs.

Any mode of operation of a digital media player device other than standard playback may be known as trick play. Trick play commands include, pause, fast-forward, double fast-forward, triple fast-forward, quadruple fast-forward, rewind, double rewind, triple rewind, quadruple rewind, slow playback, slow rewind, frame advance, go back (e.g., thirty seconds), start over, etc.

A substantial source of revenue in the media production and delivery industries is payment for additional media asset (e.g., advertising) space within a first media asset. This includes, for example, commercials aired before, after, or in the middle of a content asset, advertisements before, after, or in the middle of media delivered via the Internet or other information networks, advertisements placed on recorded media such as DVDs and CDs, and advertisements placed within podcasts, etc.

A user avoids, such as by fast-forwarding, portions of the additional media assets within the first media asset. A first media asset may be supplemented with secondary media assets to make up for any skipped additional media assets. A user may focus on portions of additional media assets. Accordingly, additional information may be associated on objects in additional media assets with which the user is focusing.

A secondary media asset (e.g., an advertisement, supplemental information, etc.) may be associated with objects (e.g., soda cans, suits, wall paint, actors, etc.), already existing within a first media asset (e.g., a television show). Secondary media asset providers may be able to generate and/or edit a secondary media asset and/or other information associated with the secondary media asset post-production. For example, additional information (e.g., an advertisement for COCA-COLA®) may be associated with any object (e.g., any soda can) in a scene of a previously produced sitcom. Additionally or alternatively, different information (e.g., an advertisement for PEPSI®) may be associated with the same object (e.g., the soda can) in a different airing of the scene of the sitcom. Different information may be associated with different objects in a media asset at different times associated with the media asset.

Any number of secondary media assets may be associated with any number of objects within a first media asset. Because media devices have limited output space, causing a plurality of secondary media assets to be output in association with a first media asset may obfuscate output of the first media asset. Accordingly, a secondary media asset may be output in response to execution and/or during trick play (e.g., pause, fast-forward, etc.) of a first media asset.

A first media asset (e.g., television content) may be stored on the network both in its standard format (e.g., a standard MPEG file), and in one or more associated trick files. For example, there may be a different trick file for each different trick mode of operation. Thus, for example, a fast-forward trick play may result in playing I-frames (e.g., an intra-coded picture or video frame) at one-second intervals for $\frac{1}{4}^{th}$ of a second. The trick file associated with the original standard MPEG file may be another MPEG file containing the content of the I-frames separated by one-second intervals within the original MPEG file output for $\frac{1}{4}^{th}$ second each, thereby providing the illusion that the first media asset is being fast-forwarded. Thus, when a user watching content selects fast-forward, the selection of fast-forward may be mapped to the corresponding portion of this trick file so that the content server delivers to that user the appropriate portion of that trick file, rather than the original standard MPEG file.

The trick file may not necessarily be generated and stored in advance; the trick file may be generated on the fly when the trick mode is selected. For example, a pause command may halt output of the original MPEG file and may generate a trick file containing one or more I-frame(s) corresponding to the original MPEG file at a timestamp associated with activation of the pause command Output of the single I-frame (and/or a loop series of I-frames) until after another command is received may provide the illusion that the first media asset is paused.

An overlay may be output with a secondary media asset in association with the first media asset or the trick file. For example, the secondary media asset may be substituted for, placed in front of, overlaid on with a constant or varying degrees of transparency (e.g., from 0 to 100%), juxtaposed with, and/or tiled with the first media asset/the trick file illustrating the trick play command. The secondary media asset may correspond to objects placed within the first media asset. For example, if the first media asset comprises a car chase scene with a SUBARU® WRX STi and a MITSUBISHI® Lancer Evo, a secondary media asset pertaining to the WRX STi and comprising additional information, websites, links, videos, etc., may be overlaid on the WRX STi. Likewise, a secondary media asset pertaining to the Lancer Evo and comprising additional information, websites, links, videos, etc., may be overlaid on the Lancer Evo. The overlaid information may be output during trick play to not interfere with the content of the first media asset.

Advertisers may choose to supply the secondary media asset in association with the first media asset. Additionally or alternatively, advertisers may bid to have different video objects representing in the underlying video (e.g., different images of a beverage (e.g., COKE®, PEPSI®) for a particular area or time period. Thus, if the content is sponsored by PEPSI®, a PEPSI® can may appear whereas if the content is sponsored by COKE®, a COKE® can may appear in the video. Further, if an advertiser (e.g., MITSUBISHI®) chooses not to take advantage of overlaying secondary media, then no secondary media asset may be overlaid on the corresponding object (e.g., MITSUBISHI® Lancer Evo) of the first media asset during trick play. Additionally or alternatively, a competitor may choose to advertise their substitute goods over the media object of a competitor. An advertiser may pay to have his or her goods substituted for the underlying media object via substitution of video fragments in the underlying programming based on inputs from a manifest file, which may be keyed off an advertising profile inputs. A media content provider may sell secondary media asset avails to other advertisers (e.g., alternate car manufacturers, third-party automotive part supplier, third-party automotive services, etc.), such that a secondary media asset from the other advertisers may be overlaid on the first media asset during trick play.

The secondary media asset may be output in a portion of the output area specific to an object within the first media asset. The secondary media asset may be output anywhere in the output area disassociated with the underlying objects of the first media asset. The secondary media asset may be slightly transparent, such that trick play of the first media asset may be still be seen in the background. The secondary media asset may be any size (e.g., one or more pixels, the entire output area, larger than the entire output area, etc.). The secondary media asset may take any number of forms, including, without limitation, still images, video, text, links, website portals, applications, games, etc. The secondary media asset may be output as a hypertext markup language five ("HTML5") overlay. The advertised media object may be represented by video fragments that have higher resolution or frame rate making them appear to stand out from other video objects and thereby make them more appealing to the end user. For example, before and after views of a model before and after applying makeup may have an enhanced video resolution (e.g., 4 K, 8 K, 16 K and/or 24 K video) applied to the "after" image of the model once the advertised product has been applied. The video fragments may be increased in size slightly, but may be processed at the same speed as surrounding video fragments and thus seamlessly integrated into the video. The increased resolution and/or frame rate may also be applied to the area representing the product while the remainder of the video frame remains at a lower video resolution/rate.

In order to associate a secondary media asset with an object within the first media asset, the time that the object is on-screen may be utilized with the location of the object with respect to the media device screen. A timestamp associated with execution of a trick play command (e.g., the time within the first media asset duration at which a pause command was initiated, the time within the first media asset duration that a fast-forward command is being executed, etc.) may be used to identify what secondary media asset to overlay on the first media asset and where to overlay the secondary media. For example, fifteen minutes into the first media asset, a particular actor may appear on screen. A secondary media asset may be prepared for association with the particular actor. Such a secondary media asset may be located by comparing a timestamp associated with execution of the trick play command (e.g., a user paused at minute 15, the first media asset is being fast-forwarded past minute 15, etc.) to pre-defined time windows associated with the length of time that the particular actor is on-screen. If the timestamp is within a pre-defined time window for a secondary media, that secondary media asset and its spatial location information may be located. The secondary media asset may be output at the spatial location at the time associated with the timestamp.

A secondary media asset may be individually addressed to specific users. A household within a neighborhood having an average home sale price above a certain threshold may receive a secondary media asset corresponding to the SUBARU® WRX STi, whereas another household within a neighborhood with lower average residential real estate prices may receive a secondary media asset corresponding to a SUBARU® Impreza (a lower cost base model of the SUBARU® WRX STi). The targeted secondary media asset may be different depending on the specific user or user demographic profile. For example, users over the age of 35 may not be output with additional information regarding the SUBARU® WRX STi or the MITSUBISHI® Lancer Evo (or their base models), because such vehicles are generally targeted towards a younger demographic.

The use of a secondary media asset is not limited to outputting the secondary media asset during portions of a first media asset. It may be possible to provide a secondary media asset to users when they are using other trick play commands during advertising content (e.g., commercials) before, during, or after the first media asset, as such examples may provide additional advertising opportunities.

The secondary media asset may comprise supplemental information that could not be output in a threshold amount of time or information that may be different from the content of the underlying media. For example, the secondary media asset may include additional information about actors or actresses within a scene (e.g., an actor's or an actress' Wikipedia or IMDB page), the type and/or color of the paint on the walls of the scene, the brand and/or designers of the clothing worn by the actors or actresses, etc. Additionally or alternatively, the secondary media asset may replace or supplement the content of a conventional trick file with other content perceivable and, hopefully, of interest to the user. For example, the secondary media asset may be a MERCEDES-BENZ® v. CADILLAC® car chase scene that replaces the SUBARU® v. MITSUBISHI® car chase scene.

FIG. 1 shows an example information distribution network 100. The network 100 may be any type of information distribution network, such as satellite, telephone, cellular, wireless, etc. One example may be an optical fiber network, a coaxial cable network or a hybrid fiber/coax (HFC) network. Some such networks may use a series of interconnected communication lines 101 (e.g., coaxial cables, optical fibers, wireless, etc.) to connect multiple homes 102 to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to the various homes 102 in the vicinity of (which may be many miles from) the central office 103. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The TS 104 may be as specified in a standard, such as the Data Over Cable Service Interface Specification (DOCSIS) standard, published by Cable Television Laboratories, Inc. (a.k.a. CableLabs) for HFC-type networks, or it may be a similar or modified device instead. The TS 104 may be configured to place data on one or more downstream frequencies to be received by modems at the various homes 102, and to receive upstream communications from those modems on one or more upstream frequencies. The central office 103 may also include one or more network interfaces 108, which may permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand content, data, television content, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, the application server 107 may be responsible for collecting content information and generating a data download for content listings. Another application server may be responsible for monitoring user viewing habits and collecting that information for use in selecting advertisements. Another application server may be responsible for formatting and inserting advertisements in a video stream being transmitted to the homes 102. Other application servers 107 may be used for billing, entitlements, voice over Internet Protocol handling, single sign-on, and any other desired feature. Additionally or alternatively, another application server may be responsible for presenting an overlaid secondary media asset based on received trick play commands.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to enable one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as an output device 112, a plurality of STBs 113, a plurality of personal computers 114, a plurality of laptop computers 115, a plurality of wireless devices 116 (wireless laptops and netbooks, mobile phones, mobile output devices, personal digital assistants (PDA), etc.), and/or any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Some devices, such as the plurality of wireless devices 116, may be used as a user's remote control device, described further below. These devices may also be usable outside of a home 102.

Figure 2:
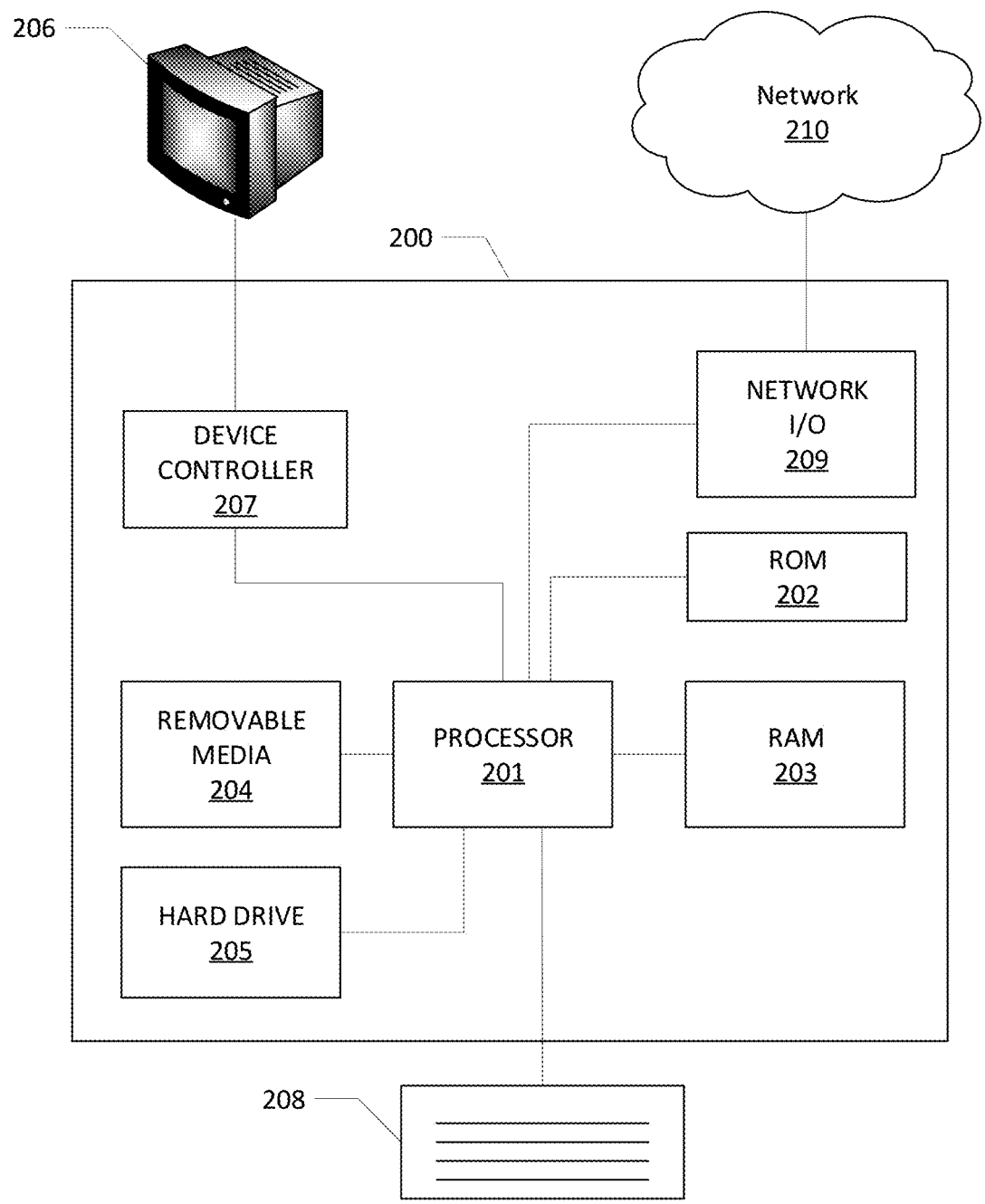
FIG. 2 is an example hardware platform on which the various elements described herein may be implemented.

FIG. 2 shows general hardware elements (some of which alternately may be implemented in software) that may be used to implement any of the various computing devices discussed herein. The computing device 200 may include one or more processors 201, which may execute instructions of a computer program. The instructions may be stored in any type of tangible computer-readable medium or memory, to configure the operation of the processor 201. As used herein, the term tangible computer-readable storage medium is expressly defined to include storage devices or storage discs and to exclude transitory transmission media and propagating signals. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, and/or any other desired computer-readable storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, software user interface, etc. The computing device 200 may also include one or more network interfaces, such as one or more input/output circuits 209 (such as a network card) to communicate with an external network 210. The network interface may be a wired interface, wireless interface, or a combination of the two. The interface 209 may include a modem (e.g., a cable modem), and the network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
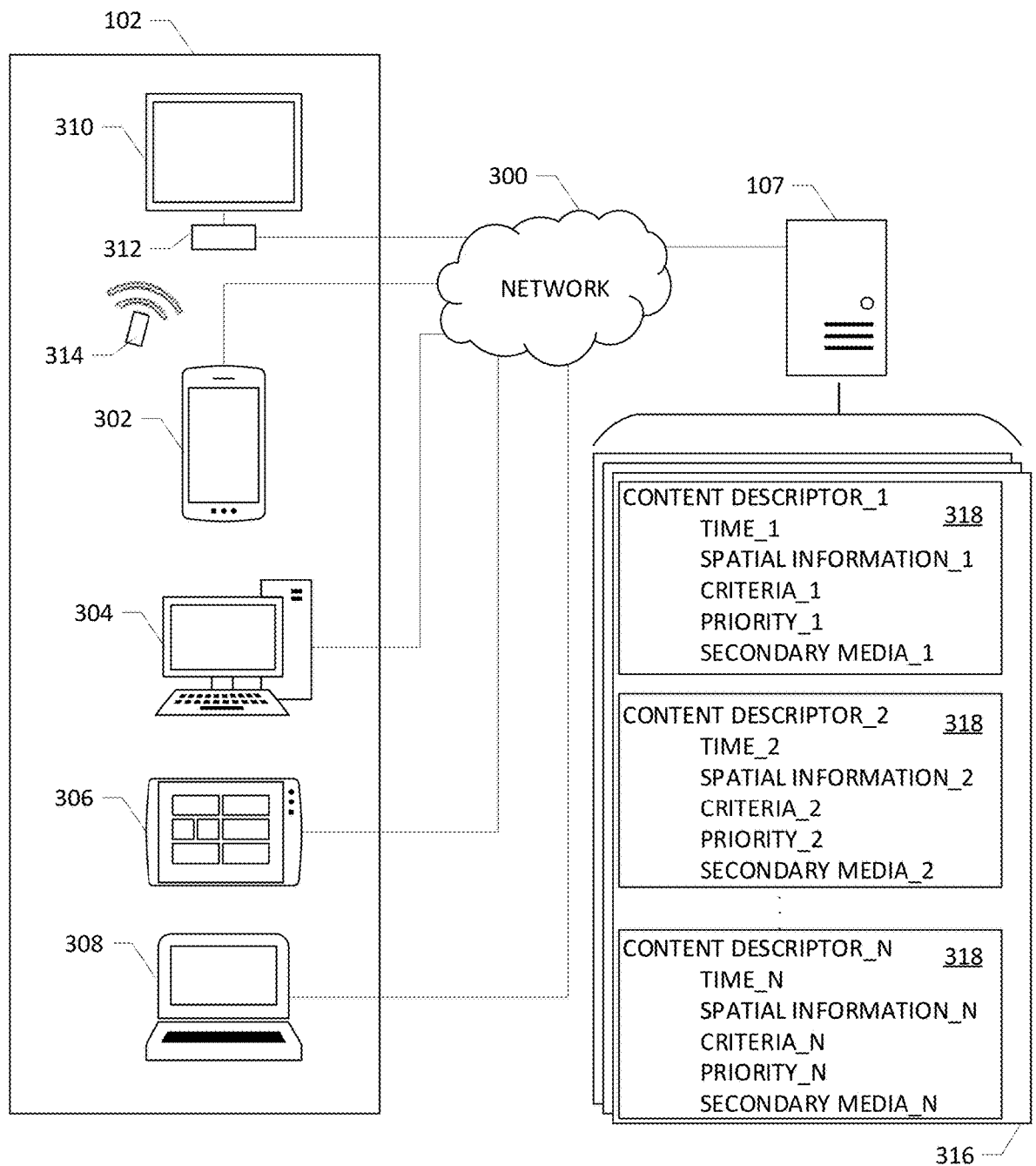
FIG. 3 is as example environment comprising devices connected to a server via a network.

Users accessing content from the central office 103 may have improved experiences. For example, one such user may be a viewer who may be watching television content being transmitted from the central office 103. FIG. 3 comprises an example home 102 in communication with an application server 107 from the central office 103 over a network 300. As shown within the example home 102, a user may be able to access a first media asset using any media device, such as a smartphone 302, a personal computer 304, a tablet computer 306, a laptop or netbook computer 308, a smart television, etc., an output device 310, or a gateway 312. Example media devices may comprise at least the elements described with reference to the computing device 200.

The gateway 312 may transmit a first media asset to the output device 310 for output to a user. The user may control output of the first media asset via commands (including trick-play commands) from a wireless device 314, such as, for example, a remote control. When the user activates a trick-play command, such as pause or fast-forward, on the wireless device 314, a first signal may be transmitted to the gateway 312 to perform the trick-play command. The gateway 312 may send a second signal to the application server 107 via the network 300 in response to or after receiving the trick-play command. The second signal may include identification information for the first media asset, a timestamp associated with the trick-play command, identification information for the user, etc.

Additionally or alternatively, commands may be activated without the wireless device 314 using alternate input techniques such as voice activation, touchscreen, keypress, wired mouse or touchpad click, etc. For example, the smartphone 302, the personal computer 304, the tablet computer 306, and/or the laptop or netbook computer 308 may have touchscreens that enable a user to activate commands via touching the screen. Accordingly, the smartphone 302, the personal computer 304, the tablet computer 306, and/or the laptop or netbook computer 308 may be both a controller and a presenter. Thus, upon activation of a trick-play command (e.g., via a touchscreen), the smartphone 302, the personal computer 304, the tablet computer 306, and/or the laptop or netbook computer 308 may send a signal to the application server 107 via the network 300. The signal may include identification information for the first media asset, a timestamp associated with the trick-play command, identification information for the user, etc.

The application server 107 may locate one or more manifest files 316. The identification information for the user may be used to identify a manifest file 316 corresponding to the user. A secondary media asset may be targeted directly towards the user. Additionally or alternatively, the identification information for the first media asset may be used to identify a manifest file 316 corresponding to the first media asset. The manifest file 316 may correspond with a particular channel or network and may be segmented based on content and/or broadcast times associated with the particular channel or network. The identification information for the first media asset may be used to identify a manifest file 316 including a segment associated with the first media asset. One or more of the smartphone 302, the personal computer 304, the tablet computer 306, the laptop or netbook computer 308, the output device 310, or the gateway 312 may download or otherwise access the located one or more manifest files 316.

Each manifest file 316 may contain addresses or pointers to a plurality of content descriptors 318. The content descriptors 318 may be designated files identified by the manifest file 316. Each of the plurality of content descriptors 318 may correspond to a different secondary media asset and data associated with the secondary media. For example, a content descriptor 318 may contain the secondary media asset (e.g., link, text, image, audio, video, application, game, interactive media, etc.), the time in the first media asset in which the secondary media asset should appear (e.g., start time, stop time, duration), the spatial information corresponding to location(s) in the first media asset with which the secondary media asset may be associated (e.g., XY coordinates), additional criteria (e.g., demographic qualifications), priority information, etc. Thus, the content descriptor 318 may describe the content, time, position, and additional qualifications associated with the secondary media.

Accordingly, the manifest file 316 may identify each and every secondary media asset that may be associated with the first media asset.

Additionally or alternatively, the manifest file may be a container with a plurality of content descriptor files. The content descriptors 318 may be subgroups within the larger manifest file 316 (e.g., the manifest file may be a table with a plurality of content descriptors within rows and columns of the table). As shown in FIG. 3, each manifest file 316 may identify n content descriptors 318.

A secondary media asset provider may generate/edit or request generation and/or edits of content descriptors 318 associated with secondary media. The application server 107 may provide such access to secondary media asset providers through a user-interface. The application server 107 may collect a plurality of content descriptors with varying information and organize the plurality of content descriptors into the manifest files 316 based on channel, network, content, broadcast times, etc.

An example content descriptor 318 may comprise a secondary media asset associated with a BUD-LIGHT® beer can that appears in the first media asset on a table 15minutes into the first media asset. The example content descriptor 318 may contain a BUD-LIGHT® video commercial as the secondary media. The example content descriptor 318 may include a start time at 15:00 relative to the beginning of the first media asset. The example content descriptor 318 may contain a stop time, a duration, or another indication of the length of time the BUD-LIGHT® beer can appears in the first media asset (e.g., stop time at 15:20, duration of 20 seconds, etc.).

The example content descriptor 318 may include spatial information, such as XY coordinates, as to where in the first media asset the BUD-LIGHT® beer can appears on-screen. For example, the BUD-LIGHT® beer can may be positioned in the lower left corner of the screen (e.g., X:0, Y:0). Accordingly, a secondary media asset associated with the BUD-LIGHT® beer can may be output over the first media asset in the lower left corner of the screen based on the spatial information within the content descriptor 318. The spatial location information may comprise a plurality of data types including object type, height, width, geometric shape, etc. The spatial location information may be stored in association with the manifest file 316. Additionally or alternatively, the spatial location information may be determined on-the-fly using edge detection technology. Fuzzy areas may surround the center of an object associated with secondary media, thereby enlarging the area for user selection. The spatial location information may include XY coordinates and a fuzzy area radius. Additionally or alternatively, objects may have distinct borders defined by the spatial location information (e.g., height, width, shape, etc.).

A safe area may be defined around the perimeter of the screen. The safe area may be void of a secondary media asset because, for example, the secondary media asset may be potentially cut off by the edges of the screen. Accordingly, the application server 107 may refrain from causing a secondary media asset to be output when the spatial location information for the content descriptors 318 corresponds to locations on screen within the safe area. Additionally or alternatively, the application server 107 may determine that the spatial location information for the content descriptors 318 corresponds to locations on-screen within the safe area and adjust the spatial location information such that the secondary media asset may be output outside of the safe area.

A content descriptor 318 may not include any spatial information, may include a height and/or width larger than the screen, and/or may include a radius larger than the screen. The secondary media asset may fill the entire screen.

The example content descriptor 318 may include different spatial information for the same secondary media asset at different times. For example, an item in the first media asset 500 may move across the screen. Accordingly, the content descriptor 318 may contain the locations in the first media asset 500 to associate the secondary media asset at specific times. For example, at a first time the secondary media asset may be at a first location on the screen, at a second time the secondary media asset may be at a second location on the screen, etc. Different content descriptors 318 may exist for the same secondary media asset (e.g., each content descriptor may contain one secondary media asset, may contain one time in the first media asset in which the secondary media asset appears, may contain one location in the first media asset with which the secondary media asset may be associated, etc.).

The example content descriptor 318 may include qualifying criterion. Such qualifying criterion may be compared to the user identification information (e.g., device identifier, social media cookies, etc.) received from the smartphone 302, the personal computer 304, the tablet computer 306, the laptop or netbook computer 308, and/or the gateway 312 to determine targeted secondary media. For example, a secondary media asset may be targeted based on user demographics (e.g., age, gender, location, income, etc.), holidays, sales, search history, viewing history, third party tracking, social media likes/dislikes, etc. The qualifying criterion may include restrictions such as, "gender=male," "gender=female," "age>20," "household income<100,000," "location=Chicago," etc. The application server 107 may identify content descriptors targeted for certain individuals. For example, a secondary media asset associated with a BUD-LIGHT® beer can may not be accessed and output when there are users under the age of 21 viewing the first media asset 500. As another example, a secondary media asset associated with Valentine's Day may be accessed and output during the beginning of February.

The qualifying criterion of the content descriptor 318 may be compared to media device specifications, such as resolution, to determine a secondary media asset best suited for the media device. For example, objects with a small pixel footprint (e.g., a tie clip) may not be identifiable in low quality feeds, thereby making reference to a secondary media asset inappropriate. Accordingly, the content descriptors 318 associated with objects with small pixel footprints may be output on media devices with high resolution and may not be output on media devices with low resolution.

The example content descriptor 318 may include priority information such that when a trick play command is activated, the BUD-LIGHT® beer can with which the secondary media asset is associated may be indicated, emphasized, highlighted, or otherwise output based on the priority information. For example, if there is a secondary media asset associated with the table on which the BUD-LIGHT® beer can resides, the secondary media asset associated with the BUD-LIGHT® beer can may be output first. Additionally or alternatively, the secondary media asset associated with the table may be output first. A secondary media asset provider may bid for higher priority. The secondary media asset may be emphasized based on user navigation (e.g., using a remote, touch screen, etc.)

The manifest file 316 may be dynamic and/or may contain a plurality of alternate content descriptors. The plurality of content descriptors 318 may change and/or have a plurality of alternate versions based on location, time of day, time of year, episode, status (e.g., live or rerun), day, week, type of media device, type of trick play command executing, etc.

Figure 4:
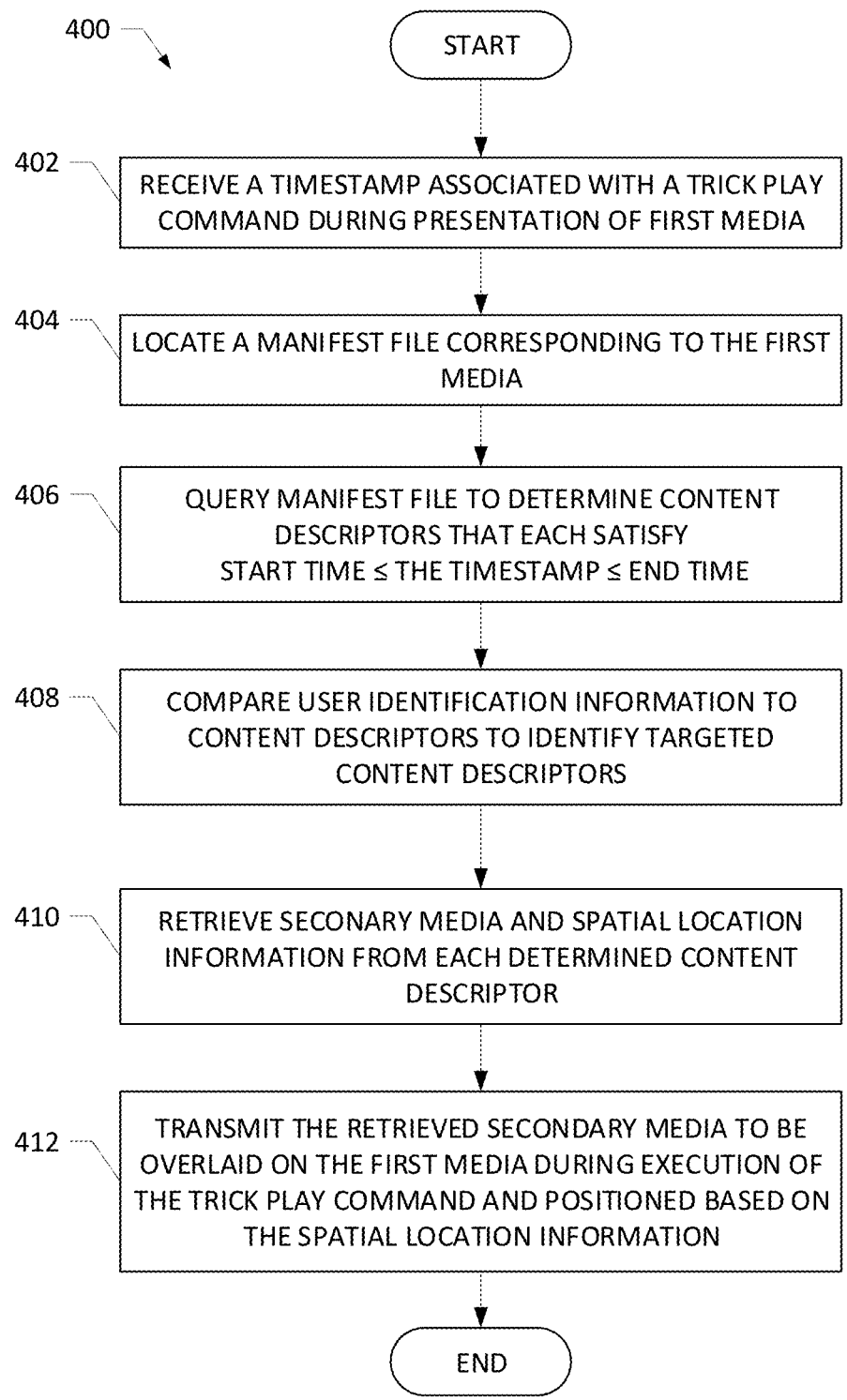
FIG. 4 is a flow chart of an example of a method for determining a secondary media asset for output in combination with a first media asset.

A flow chart for an example process 400 is shown in FIG. 4. The example process 400 may be implemented by one or more processors executing computer readable instructions stored in a memory or other tangible computer readable storage medium. The example process 400 begins at block 402 when the application server 107 receives a timestamp associated with a trick play command. For example, a user may have initiated a fast-forward trick play command. In response to and/or after the trick-play command, the timestamp may be sent from the gateway 312 (or from the smartphone 302, the personal computer 304, the tablet computer 306, the laptop or netbook computer 308) to the application server 107. The application server 107 may locate a manifest file corresponding to the first media asset (block 404). The application server 107 may utilize received media identification information to identify a manifest file for the first media asset. At block 406, the application server 107 may query the manifest file to determine a plurality of content descriptors 318 that each have start times less than or equal to the timestamp associated with the trick-play command and have end times greater than or equal to the timestamp associated with the trick-play command. The application server 107 may determine which of the content descriptors 318 have time windows within which the timestamp falls. Equation 1 comprises an example function that the content descriptors 318 may satisfy.

$$T_{start} \leq \text{Timestamp} \leq T_{end} \qquad \text{Equation 1}$$

Additionally or alternatively, the application server 107 may compare the identification information for the user to any qualifying criteria in the plurality of content descriptors 318 to identify targeted content descriptors (block 408). The application server 107 may identify any number of the plurality of content descriptors 318 in which the identification information for the user matches the qualifying criteria. The identification information may be used to further filter the number of the plurality of content descriptors 318 that have been matched by time. The identification information may be used to first filter the content descriptors 318, such that the application server 107 only compares the timestamp associated with the trick-play command to the content descriptors 318 filtered based on the identification information. The content descriptors 318 may be targeted to particular users, demographics, locations, etc.

After the application server 107 identifies content descriptors 318 based on the timestamp and/or user identification information, the application server 107 may retrieve a secondary media asset and spatial location information associated with the secondary media asset from each identified content descriptor 318 (block 410).

Thereafter, the application server 107 transmits the secondary media asset to the gateway 312 (or smartphone 302, personal computer 304, tablet computer 306, laptop or netbook computer 308) to be overlaid on the first media asset during execution of the trick play command (block 412). The secondary media asset may be positioned over the first media asset based on the spatial location information. Thereafter, the example process 400 may cease operation. The example process 400 may be repeated numerous times for a plurality of times and/or a plurality of secondary media. For example, a secondary media asset may be overlaid on every single object that appears within the first media asset. Some or all of the steps described above may be executed locally on the gateway 312, the smartphone 302, the personal computer 304, the tablet computer 306, or the laptop or the netbook computer 308.

Figure 5:
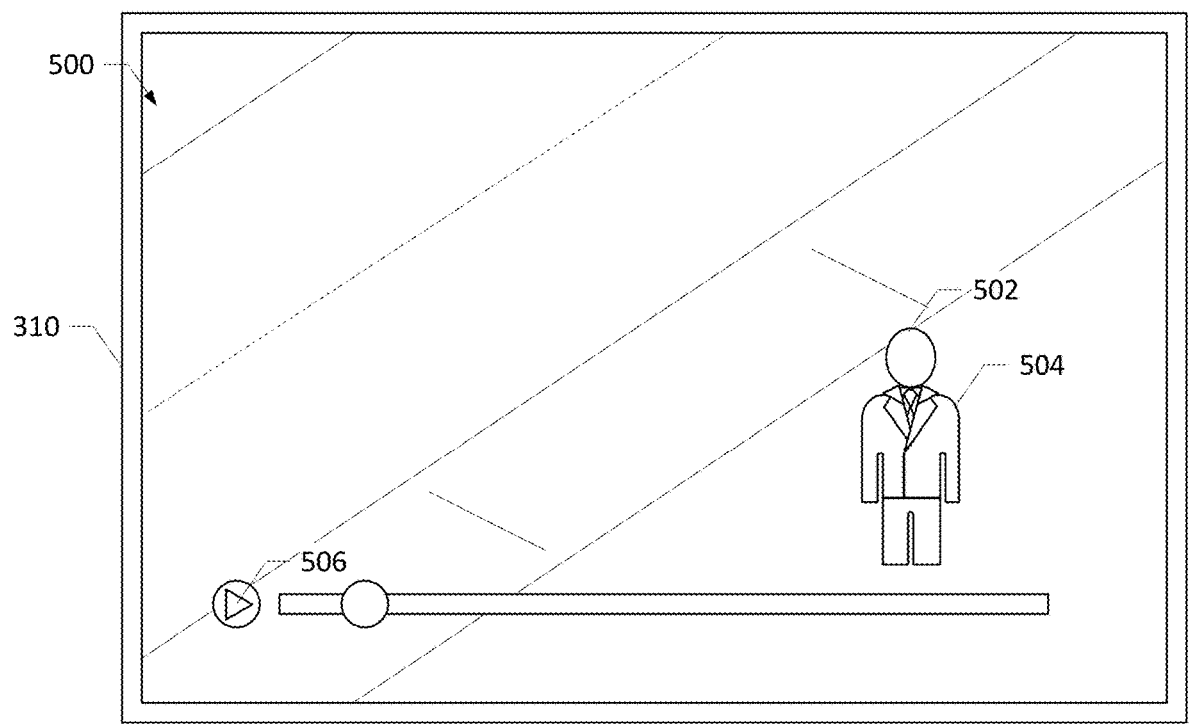
FIGS. 5-10 show examples of screenshots associated with output of first and second media assets during a first trick play command.
Figure 6:
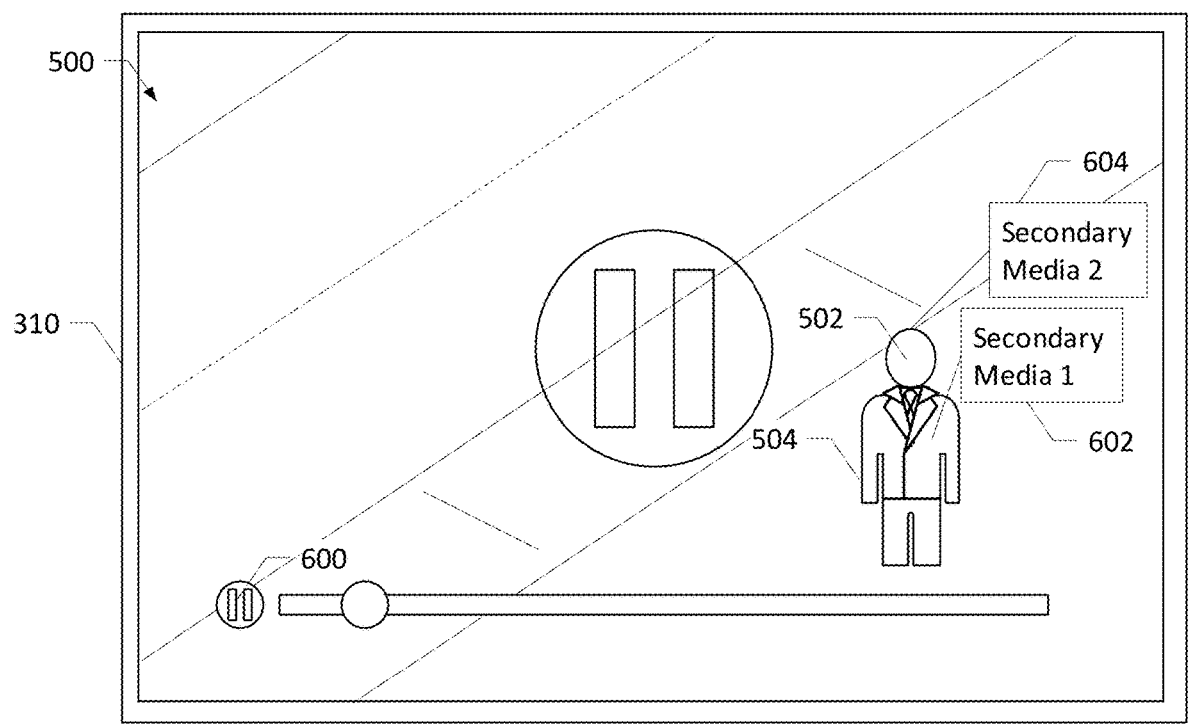

Another example will be described with reference to the screenshots of FIGS. 5-10. As shown in FIG. 5, a scene from a first media asset 500 may be output on a user device such as, for example, output device 310. The example scene may include a businessman 502 in a suit 504 walking down a street. At a first time, the example scene of the first media asset may be output during a "play" command. An indicator 506 may be output over the first media asset to identify the particular command the first media asset is currently associated with (e.g., a right facing triangle for a play command). At a second time, as shown in FIG. 6, a user may touch, select, or otherwise activate a trick-play command such as, for example, a "pause" command to alter the output of the first media asset 500. An indicator 600 may be output over the first media asset to identify the particular command the first media asset is currently associated with (e.g., two parallel rectangles for a pause command) In association with activation of the trick-play command, the application server 107 may send one or more secondary media assets to be output over the first media asset 500.

In the example of FIG. 6, a first secondary media asset item 602 and a second secondary media asset item 604 may be output over the first media asset 500. For example, the first secondary media asset item 602 may be a secondary media asset associated with the suit that the businessman 502 is wearing in the first media asset 500. The first secondary media asset item 602 may be a link to a website where the suit may be purchased by a user, a webpage associated with the designer of the suit, information about the colors, materials, and sizing of the suit, a phone number to a custom tailor, and/or similar information. The second secondary media asset item 604 may be a secondary media asset associated with the actor and/or character depicted in the first media asset 500. For example, the second secondary media asset item 604 may be an actor's international movie database (IMDB®) or WIKIPEDIA® webpage. Additionally or alternatively, the second secondary media asset item 604 may a WIKIA® webpage dedicated to the character that the actor portrays in the first media asset. Of course, any other additional information may be overlaid on the first media asset and this disclosure is not limited by way of the above-identified examples.

Figure 7:
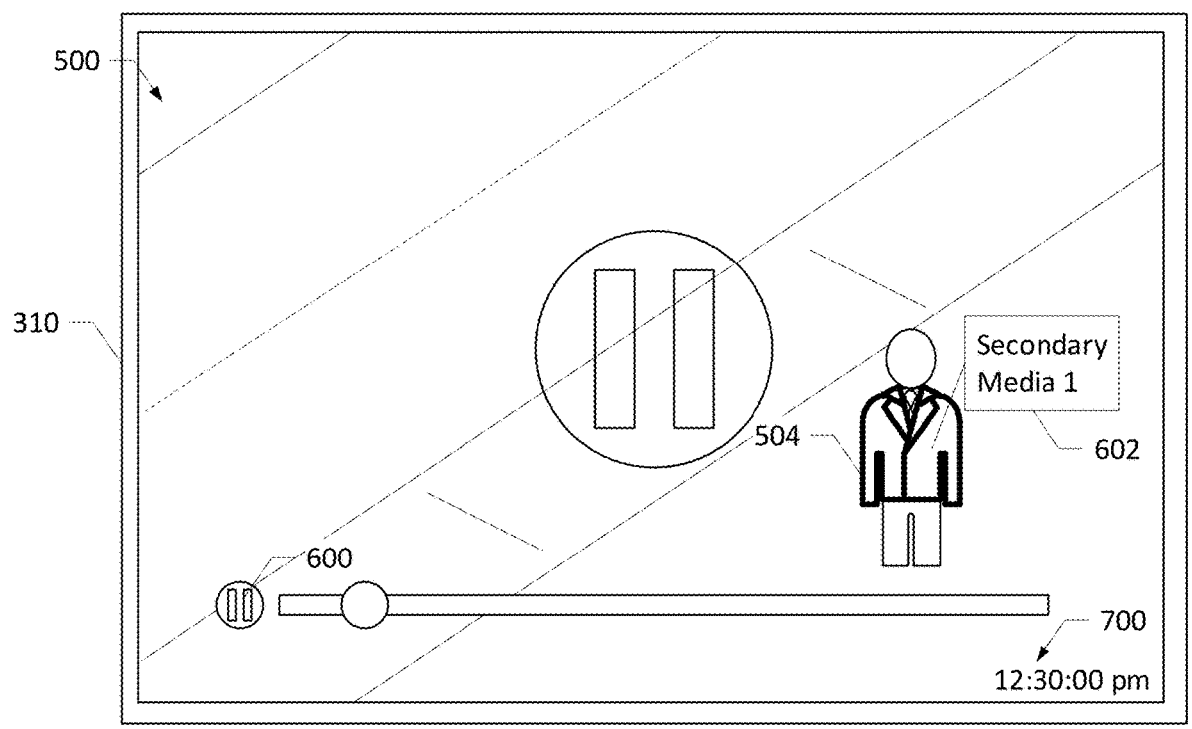
Figure 8:
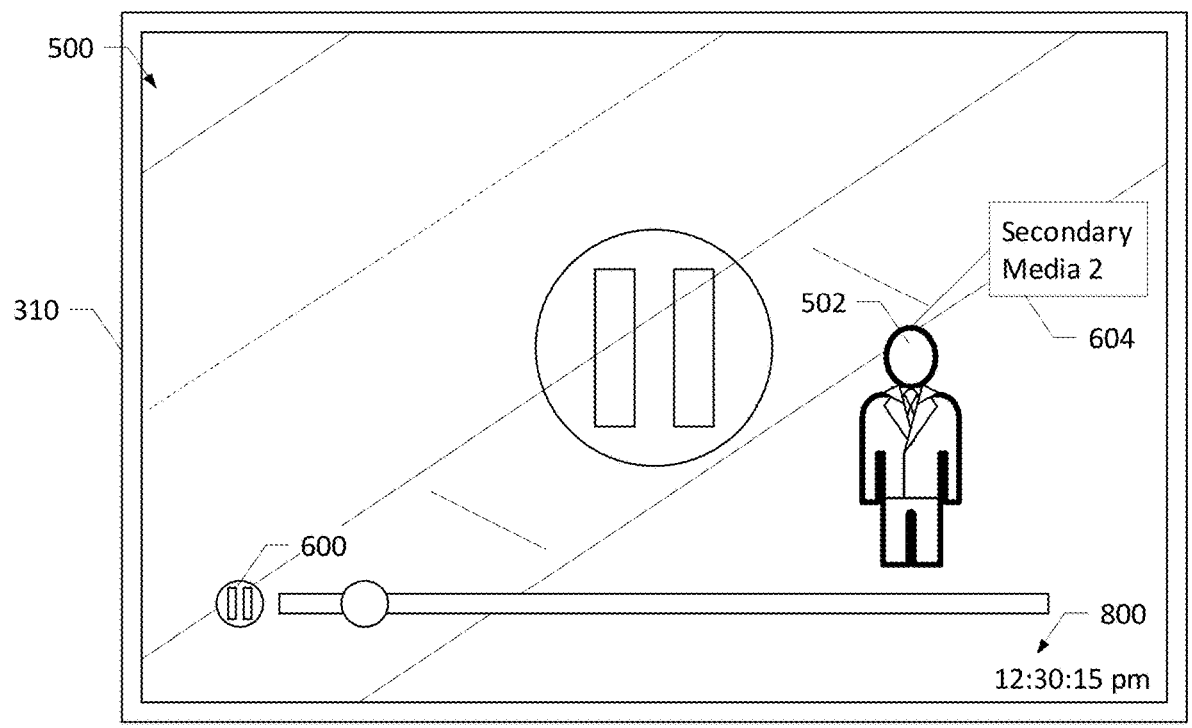

Because multiple secondary media assets may be overlaid on the first media asset 500 in response to and/or after a trick-play command (e.g., pause), the multiple secondary media assets may be prioritized such that all secondary media assets do not appear at once. For example, if every item in a scene of the first media asset 500 has secondary media assets associated therewith, the entire first media asset 500 may become obscured by all the multiple secondary media assets if the multiple secondary media assets were to be overlaid on the first media asset 500 at the same time. FIGS. 7-8 comprise example screenshots wherein different secondary media assets are highlighted during execution of the trick-play command.

For example, the object with which the first secondary media asset item 602 is associated and the object with which the second secondary media asset item 604 is associated may be highlighted or otherwise emphasized in a rotation. As shown in FIG. 7, the object with which the first secondary media asset item 602 is associated may be highlighted or otherwise emphasized at a first time 700 (e.g., 12:30:00 pm) during execution of the trick-play command and the first secondary media asset item 602 may be output. As shown in FIG. 8, the object with which the second secondary media asset item 604 is associated may be highlighted or otherwise emphasized at a second time 800 (e.g., at 12:30:15 pm) after the first time during execution of the trick-play command and the second secondary media asset item may be output. The first secondary media asset item 602 may cease to be output when the second secondary media asset item 604 is output.

The first secondary media asset item 602 and the second secondary media asset item 604 may be output in a loop such that after the object associated with the second secondary media asset item 604 is emphasized, the object associated with the first secondary media asset item 602 may be emphasized again. Such a loop may continue throughout execution of the trick-play command. The order in which objects associated with a secondary media asset are highlighted or emphasized may be based on priority information. Secondary media asset providers may bid on priority for higher priority. Additionally or alternatively, secondary media asset providers may pay for a longer period of time in which its secondary media asset is highlighted or emphasized before shifting to the next secondary media asset (e.g., default 15 seconds, pay for 30 seconds).

A secondary media asset may not appear initially, but may appear upon a manipulation command executed by a user gesture. A manipulation command may include zoom-in, zoom-out, rotate/pitch/yaw, etc. User gestures to initiate manipulation commands may include touching a screen with two fingers and expanding the fingers for zoom-in, contracting the fingers to zoom-out, rotating one finger for rotate/pitch/yaw, etc. For example, the first media asset 500 may have been recorded with a high definition, three-dimensional, and/or 360-degree video camera. Output of the first media asset may be manipulated by a user to output more content than if the first media asset 500 was recorded with a standard fixed two-dimensional camera.

Figure 9:
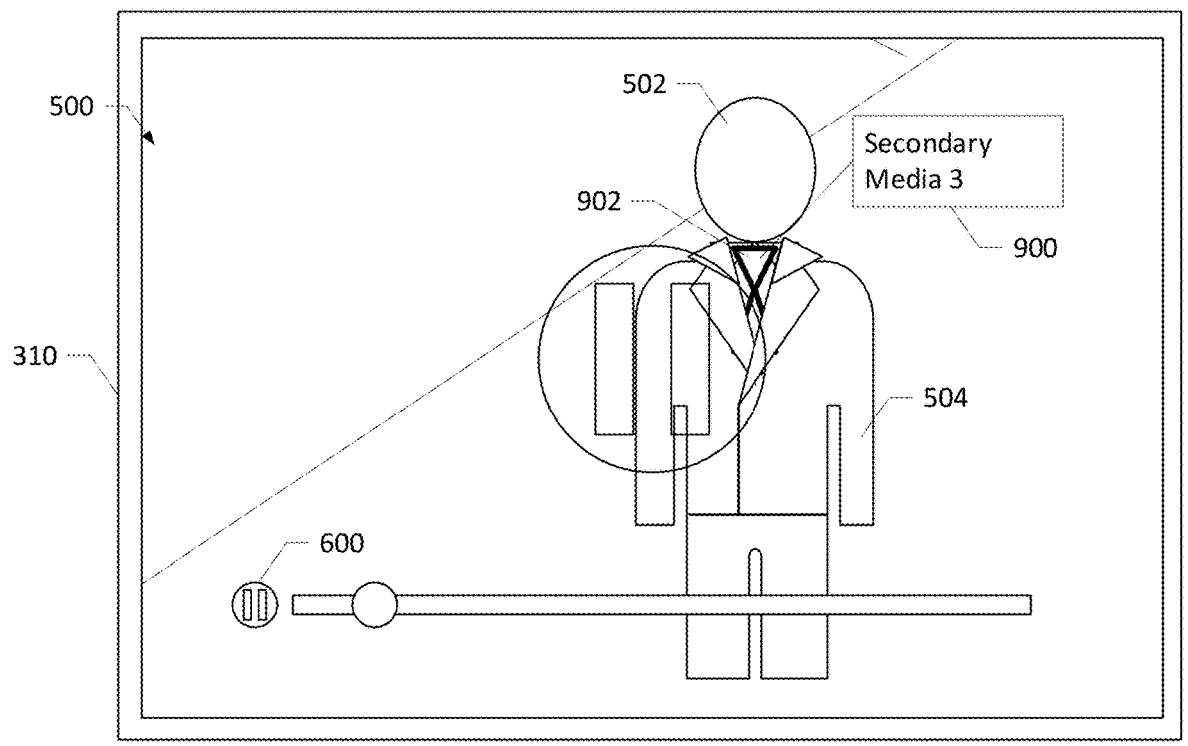

FIG. 9 shows an example zoomed-in version of the first media asset 500. As shown in FIG. 9, zooming-in may reveal a third secondary media asset item 900 not previously output with the first secondary media asset item 602 and the second secondary media asset item 604. The third secondary media asset item 900 may be a secondary media asset associated with the tie that the businessman is wearing in the first media asset 500. The third secondary media asset item 900 may be a link to a website where the tie may be purchased, a webpage associated with the designer of the tie, information about the colors and materials of the tie, a type of knot used to tie the tie, and/or other similar information. The content server 106 may send to the gateway 312 (or to the smartphone 302, the personal computer 304, the tablet computer 306, the laptop or netbook computer 308, etc.) a higher resolution feed of the first media asset 500 when a user performs a zoom-in command. The higher resolution feed may prevent pixelation during zooming techniques. Additionally or alternatively, the higher resolution feed may enable additional secondary media assets to be revealed.

Figure 10:
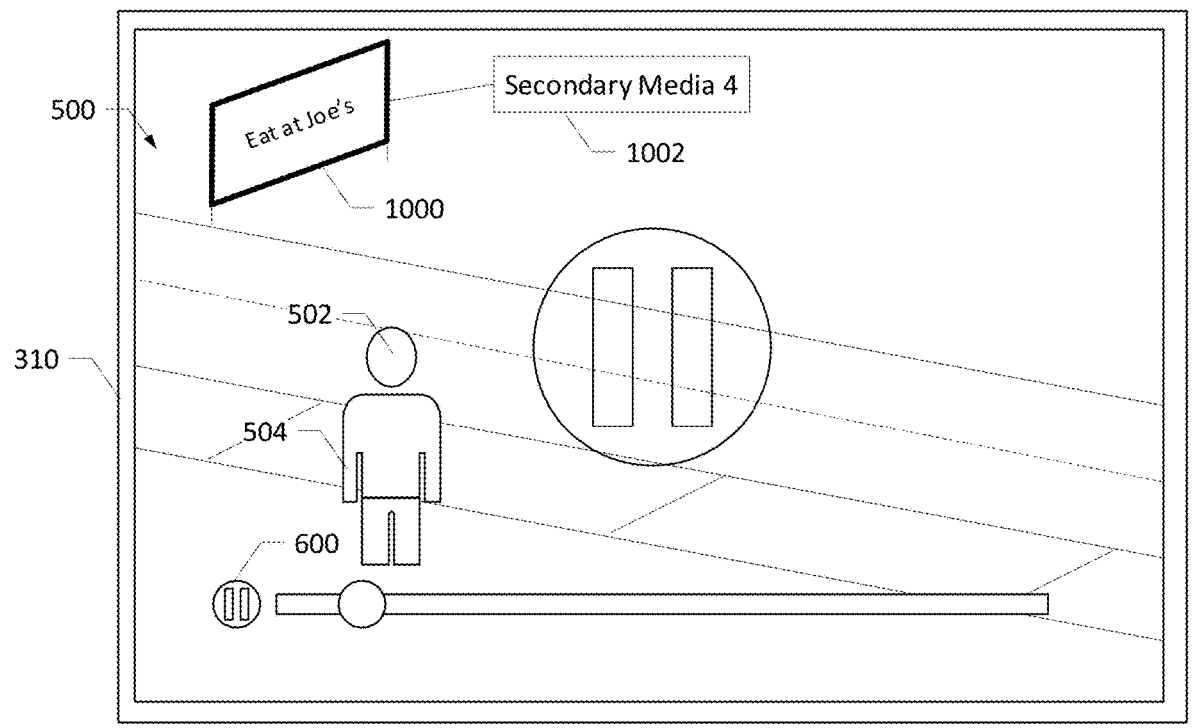

Manipulation of the first media asset 500 by the user may provide identification of additional secondary media asset items not initially shown. As in the above example, an object associated with additional secondary media assets may be layered within another object associated with the secondary media asset that was initially shown (e.g., the tie beneath the suit). Additionally or alternatively, where the first media asset 500 was recorded with a 360-degree video camera, a user may rotate the first media asset 500 to reveal not only additional content of the first media asset 500 not previously output, but also secondary media asset items associated with the additional content of the first media asset 500 not previously output. For example, FIG. 10 shows an example rotated version of the first media asset 500. As shown in FIG. 10, rotating the first media asset 500 may reveal a billboard 1000 and a fourth secondary media asset item 1002 not previously output. The fourth secondary media asset item 1002 may be a secondary media asset associated with the billboard 1000 such as link to a website associated with an advertiser on the billboard 1000, a video, interactive media content, and/or other similar information.

Figure 11A:
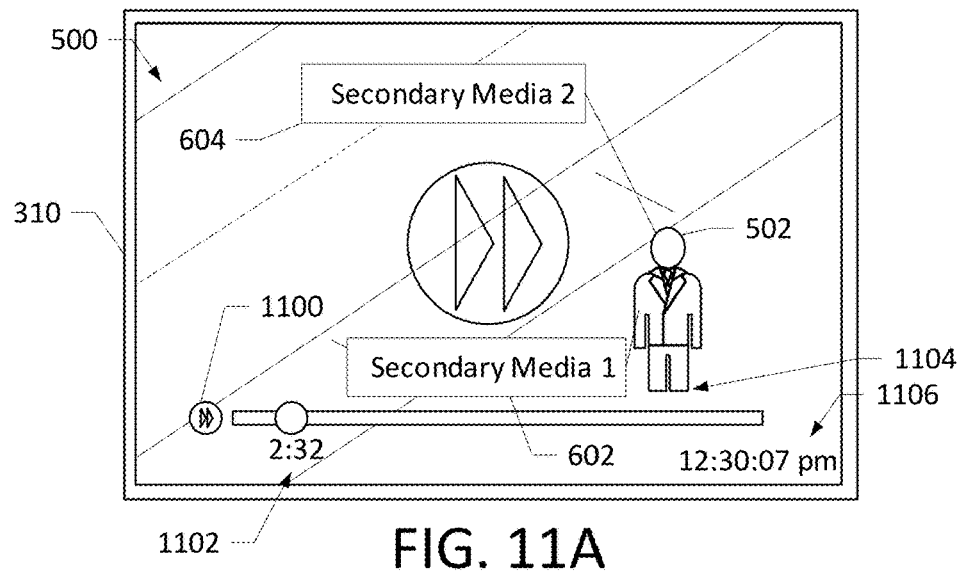
FIGS. 11A-11C show examples of outputs associated with output of first and second media assets during a second trick play command.
Figure 11B:
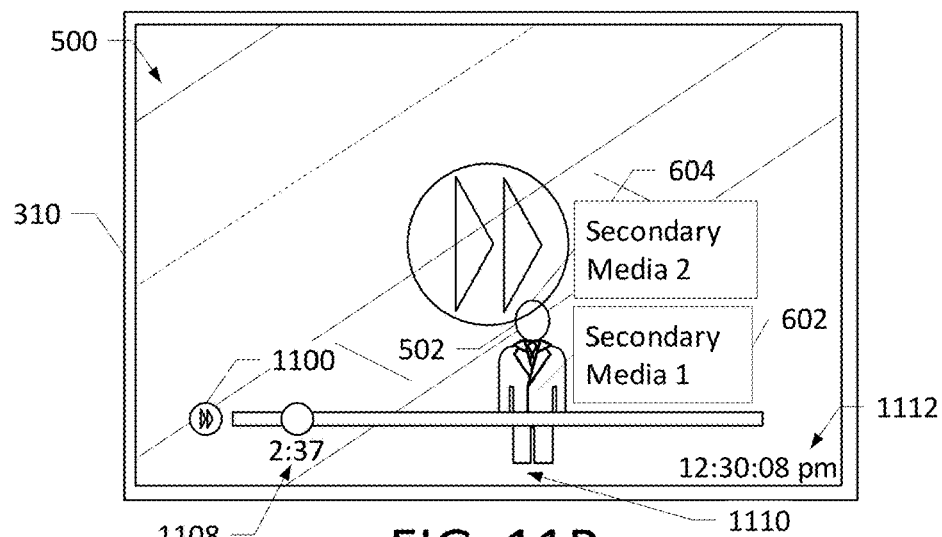
Figure 11C:
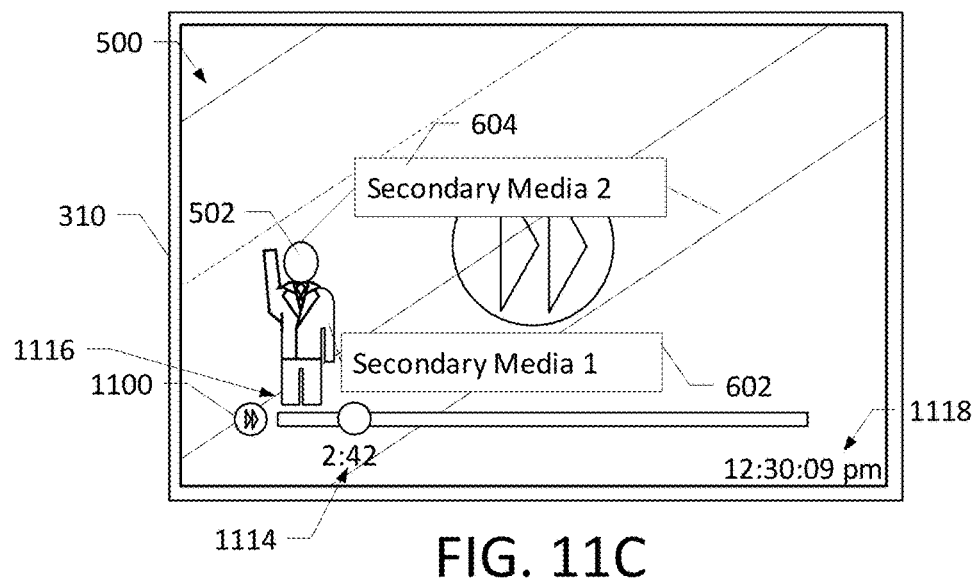

While the above discussion refers to the "pause" trick-play command, FIGS. 11A-11C show examples of the "fast-forward" trick-play command. The "fast-forward" examples may operate as described above, however, multiple timestamps may be received by the application server 107 and multiple content descriptors may be accessed. An indicator 1100 may be output over the first media asset 500 to identify the particular command the first media asset is currently associated with (e.g., two right facing triangles for a fast-forward command) Accordingly, a secondary media asset may be associated with different spatial information at different times. For example, during execution of a "fast-forward" trick-play command, the businessman 502 in the first media asset 500 may move to another location on screen. Accordingly, the secondary media asset items 602, 604 associated with the businessman 502 and a first timestamp 1102 may be output corresponding to a first location 1104 at a first time 1106, the secondary media asset items 602, 604 associated with the businessman 502 and a second timestamp 1108 may be output corresponding to a second location 1110 at a second time 1112, the secondary media asset items 602, 604 associated with the businessman 502 and a third timestamp 1114 may be output corresponding to a third location 1116 at a third time 1118, etc. The overlaid secondary media asset may progress with the first media asset 500 as a user fast-forwards through the first media asset 500. The secondary media asset items 602, 604 may be change as the first media asset 500 is fast-forwarded.

Figure 12:
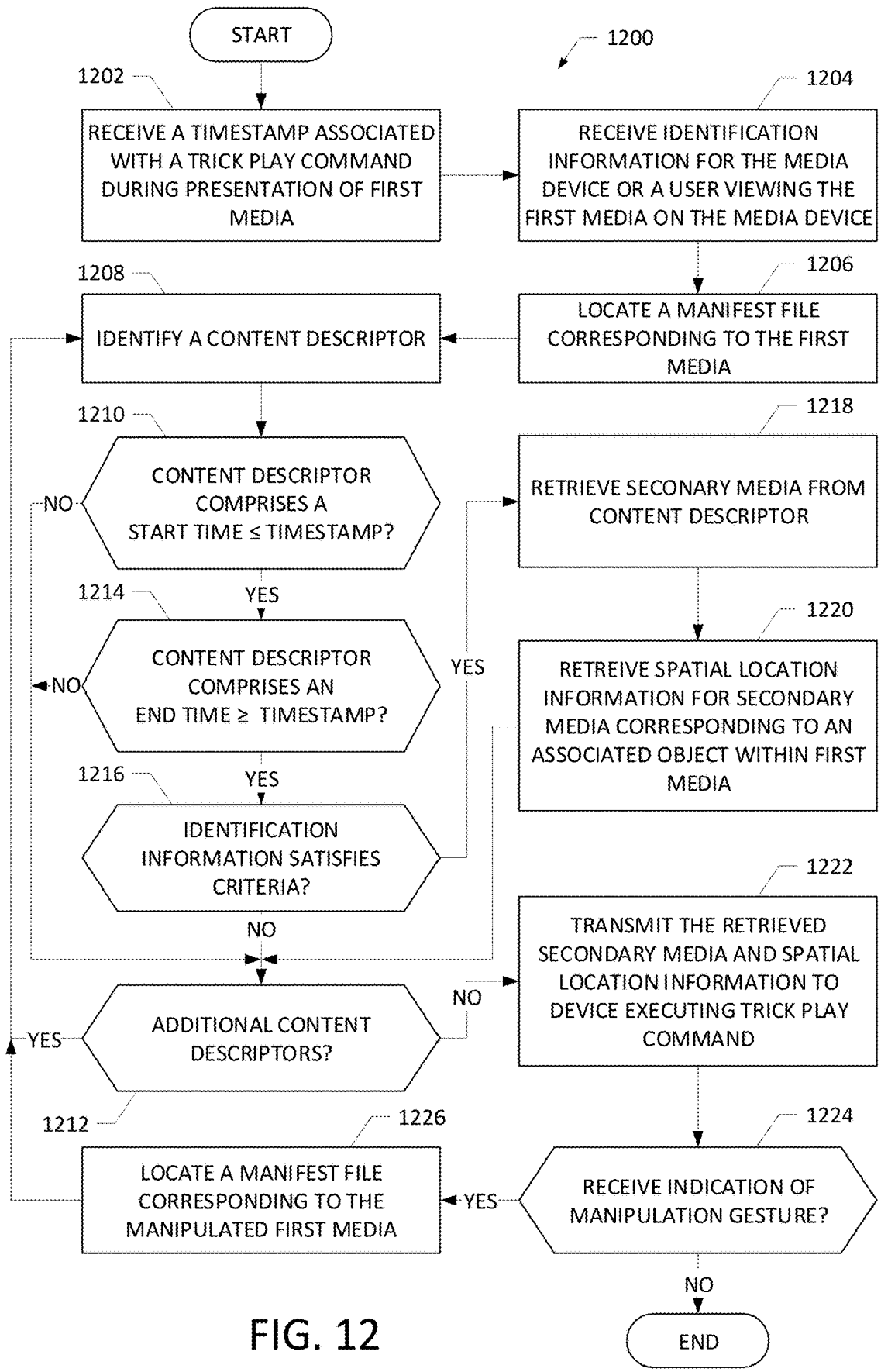
FIG. 12 is a flow chart of an example of a method for selecting secondary media assets based on timestamps associated with trick play commands executed during output of a first media asset.

FIG. 12 shows an example process 1200 to select content descriptors based on a comparison of time values associated with the content descriptors and the timestamp. Process 1200 may be performed by a server (e.g., application server 107) or other computing device. The example process 1200 may be implemented by one or more processors executing computer readable instructions stored in a memory or other tangible computer readable storage medium. The example process 1200 begins at block 1202 where the application server 107 may receive a timestamp associated with a trick play command executed during output of a first media asset. At block 1204, the example application server 107 may receive identification information for the media device or a user viewing the first media asset on the media device. The application server 107 may locate a manifest file corresponding to the first media asset (block 1206). The application server 107 may identify a content descriptor at block 1208. The identified content descriptor may be one of a plurality of content descriptors 318. At block 1210, the application server may determine whether the identified content descriptor corresponds to the timestamp. For example, the application server 107 may determine whether the identified content descriptor comprises a start time that is less than or equal to the timestamp. If the application server 107 determines that the start time is not less than or equal to (e.g., is greater than) the timestamp (block 1210: NO), control may proceed to block 1212. If the application server 107 determines that the start time is less than or equal to the timestamp (block 1210: YES), control may proceed to block 1214.

At block 1214, the application server 107 may determine whether the identified content descriptor comprises an end time that is greater than or equal to the timestamp. If the application server 107 determines that the end time is not greater than or equal to (e.g., is less than) the timestamp (block 1214: NO), control may proceed to block 1212. If the application server 107 determines that the end time is greater than or equal to the timestamp (block 1214: YES), control may proceed to block 1216.

At block 1216, the application server 107 may determine whether the identification information for the media device or identification information for the user viewing the first media asset on the first media asset device satisfies qualifying criteria. If the application server 107 determines that the identification information for the media device and the identification information for the user viewing the first media asset on the first media asset device do not satisfy the qualifying criteria (block 1216: NO), control may proceed to block 1212. If the application server 107 determines that the identification information for the media device and the identification information for the user viewing the first media asset on the first media asset device satisfy the qualifying criteria (block 1216: YES), control may proceed to block 1218.

At block 1218, the application server 107 may retrieve a secondary media asset from the content descriptor. The application server 107 may retrieve spatial location information for the retrieved secondary media asset corresponding to an associated object within the first media asset. For example, the application server 107 may retrieve a COCA-COLA® video that may be overlaid (e.g., based on the spatial location information) on a COCA-COLA® can within the first media asset at a particular time and location. Control may proceed to block 1212.

At block 1212, the application server 107 may determine whether there are any additional content descriptors within the manifest file located at block 1206. If the application server 107 determines there are additional content descriptors to evaluate (block 1212: YES), control may return to block 1208. If the application server 107 determines there are no additional content descriptors to evaluate (block 1212: NO), control may proceed to block 1222.

The application server 107 may identify a secondary media asset iteratively as described above by identifying a content descriptor, comparing the timestamp and identification information to criteria associated with the content descriptor, and moving to the next content descriptor for a similar analysis. Alternatively, the application server 107 may concurrently identify a plurality of content descriptors each satisfying a criterion. At block 1222, the application server 107 may transmit any and all retrieved secondary media assets and spatial location information to the media device executing the trick play command with which the timestamp is associated.

At block 1224, the application server 107 may receive an indication that the user executed a manipulation gesture. A user may manipulate the first media asset by zooming in, rotating, zooming out, etc. If the application server 107 receives an indication that the user executed a manipulation gesture (block 1224: YES), the application server 107 may locate a manifest file corresponding to the manipulated first media asset (block 1226). If the application server 107 does not receive any indication that the user executed a manipulation gesture (block 1224: NO), the example process 1200 may cease operation. The example process 1200 may be executed numerous times.

Figure 13:
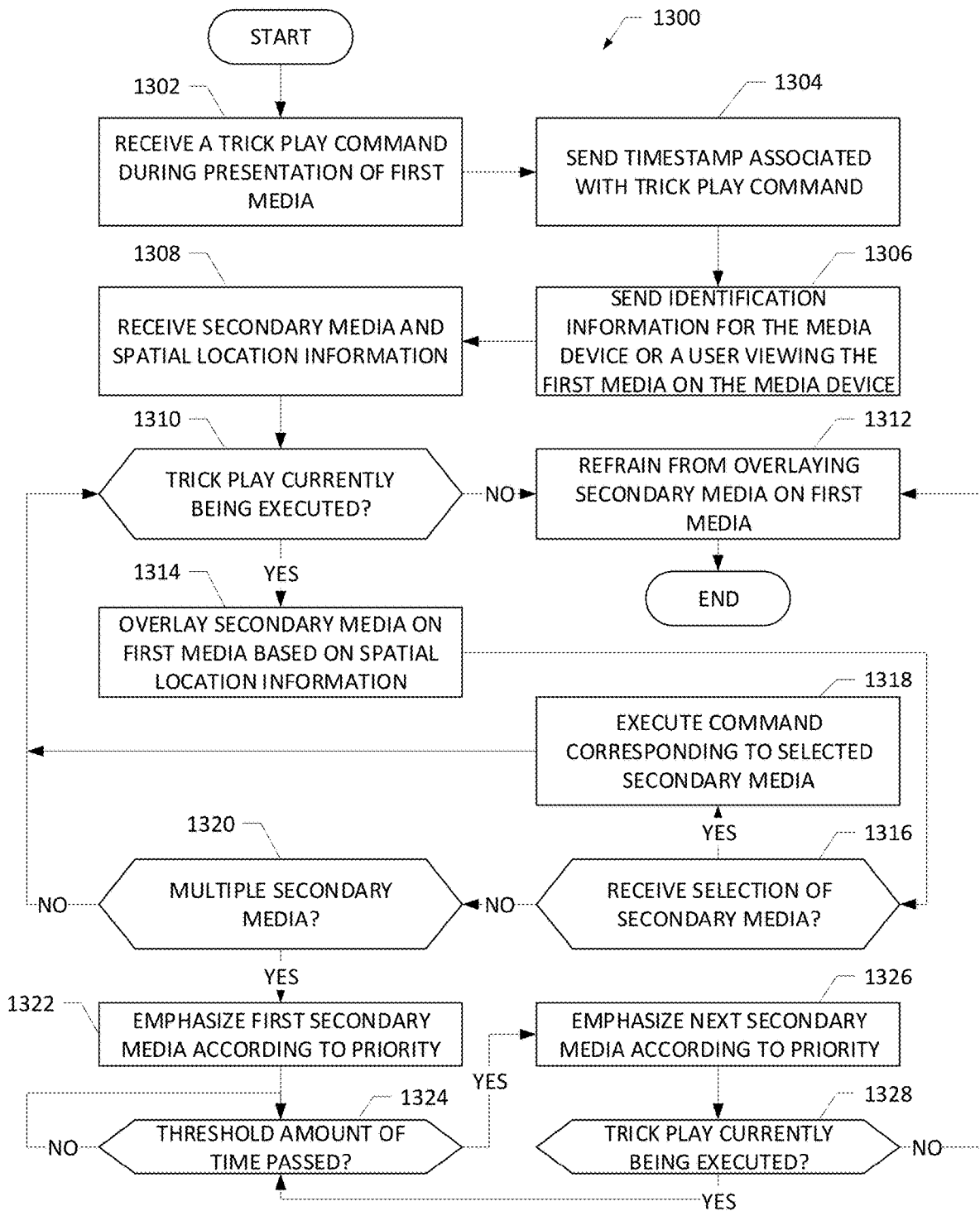
FIG. 13 is a flow chart of an example of a method for outputting secondary media assets during execution of a trick play command.

FIG. 13 shows an example process 1300, which may be performed by a device (e.g., the smartphone 302) or other computing device. The example process 1300 may be implemented by one or more processors executing computer readable instructions stored in a memory or tangible computer readable storage medium. The example process 1300 begins at block 1302 where the example media device may receive a trick play command during output of first media asset. The example media device may send, to the application server 107, a timestamp associated with the trick play command (block 1304) and/or identification information for the media device or a user viewing the first media asset on the media device (block 1306).

In response to the sending, the example media device may receive a secondary media asset and spatial location information based on the timestamp associated with the trick play command and/or identification information for the media device or a user viewing the first media asset on the media device (block 1308). The example media device may determine whether the trick play command is currently being executed (block 1310). If the example media device determines that the trick play command is not currently being executed (block 1310: NO), control may proceed to block 1312. If the example media device determines that the trick play command is currently being executed (block 1310: YES), control may proceed to block 1314.

At block 1314, the example media device may overlay the received secondary media asset on the first media asset based on spatial location information. For example, the media device may position a COCA-COLA® video (e.g., based on the spatial location information) over a COCA-COLA® can within the first media asset at a particular time and location.

A user may navigate and/or make a selection of the overlaid secondary media asset using an input device such as a touchscreen, a wireless device, a remote control, etc. Thus, the example media device may determine whether a command corresponding to selection of a secondary media asset has been received (e.g., by the processor of the media device) (block 1316). If the media device determines that a command corresponding to selection of a secondary media asset has been received (block 1316: YES), control may proceed to block 1318. If the media device determines that a command corresponding to selection of a secondary media asset has not been received (block 1316: NO), control may proceed to block 1320.

At block 1318, the media device may execute a command corresponding to the selected secondary media. For example, if the selected secondary media asset is a website link, the media device may open a browser and direct the user to the website associated with the link; if the selected secondary media asset is a video, the media device may begin output of the video; if the selected secondary media asset is text, the media device may expand the text field and zoom so that the user may read the text; etc. Thereafter, control may return to block 1310.

At block 1320, the example media device may identify whether it received multiple secondary media assets at block 1308. If the example media device did not receive multiple secondary media assets (block 1320: NO), control may return to block 1310. If the example media device received multiple secondary media asset (block 1320: YES), control may proceed to block 1322. At block 1322, the example media device may emphasize the first secondary media asset of the multiple secondary media asset that has the highest priority according to the priority information. For example, COCA-COLA® may bid to have the highest priority and thus have its secondary media asset associated with the COCA-COLA® can in the first media asset be highlighted or otherwise emphasized first when multiple secondary media assets are output. In the context of video/audio secondary media, the emphasized secondary media asset may play the audio/visual content to completion, for a threshold amount of time, until a user navigates away from the emphasized secondary media, etc. before enabling additional secondary media assets to play audio/visual content.

In the example of FIG. 13, if a threshold amount of time has not passed (block 1324: NO), the example media device may wait for user input (e.g., block 1316). After a threshold amount of time has passed since the secondary media asset was highlighted or otherwise emphasized (block 1324: YES), control may proceed to block 1326. At block 1326, the media device may emphasize the next secondary media asset according to the priority information of the multiple secondary media. At block 1328, the media device may determine whether the trick play command is currently being executed. If the media device determines that the trick play command is currently being executed (block 1328: YES), control may return to block 1324. However, if the media device determines that the trick play command is not currently being executed (block 1328: NO), control may proceed to block 1312.

At block 1312, the example media device may cease outputting or refrain from overlaying a secondary media asset on the first media asset. For example, the first media asset may be obscured by a secondary media asset and thus, it may not make sense to overlay the secondary media asset during non-trick play operation. Thereafter, the example process 1300 may cease operation.

The example media device may be in communication with the application server 107. Accordingly, although the above description details the media device performing one or more functions, such functions may be executed by the application server 107 and output on the media device. One, some, or all of the steps described in connection with FIG. 13 may be executed by the media device, the application server 107, or any combination thereof. While the above disclosure describes one or more media devices (e.g., the smartphone 302, the personal computer 304, the tablet computer 306, the laptop or netbook computer 308, the smart television, the output device 310, or the gateway 312) interacting with the application server 107, the one or more media devices may operate offline. For example, any one of the media devices may download a manifest file 316 and perform the methods described herein offline. The application server 107 may check the physical storage capacity of the media device and provide a different manifest file for download based on the storage capacity. For example, if the storage capacity of a media device is low, the application server 107 may provide a first manifest file comprising only content descriptors with the highest priority information. Likewise, if the storage capacity of a media device is high, the application server 107 may provide a second manifest file comprising all content descriptors. History regarding whether the device has previously interacted with a secondary media asset and/or previously downloaded a manifest file comprising all content descriptors may be used to determine whether to provide a manifest file comprising all content descriptors or provide a manifest file comprising a subset of content descriptors.

The secondary media asset may contain audio. Often, when a trick play command is executed, no audio is output during execution of the trick play command. Accordingly, output of audio during the execution of the trick play command may cause user discomfort. Thus, any audio output in association with the secondary media asset may be controlled by the end user (e.g., muted, turned down, etc.).

A secondary media asset may be output over the first media asset on the same media device (e.g., the smartphone 302, the personal computer 304, the tablet computer 306, the laptop or netbook computer 308, the smart television, the output device 310, or the gateway 312). Additionally or alternatively, a secondary media asset may be output over the first media asset on a second screen device. For example, if the first media asset is being output on a first screen device (e.g., the output device 310), a second screen device (e.g., the smartphone 302) may mirror the first screen device, receive the secondary media, and overlay the secondary media asset on the first media asset on the second screen device. The second screen device (e.g., the smartphone 302) may pair, register, or otherwise connect with the first screen device (e.g., the output device 310). The second screen device may "connect" with the first screen device via a text, email, or quick response (QR) code. The first screen device may sling the first media asset to the second screen device.

The secondary media asset may extend beyond the first screen device on which the first media asset is being output. For example, using the second screen device, a secondary media asset may extend into virtual space around the first screen device and be output on the second screen device if/when the second screen device is positioned towards the virtual space in which the secondary media asset extends. The second screen device may output a secondary media asset as augmented reality in association with the output of the first media asset on the first screen device.

Impressions may be generated upon both output of the secondary media asset and upon user interaction with the secondary media. As used herein, an impression is a recordation of media consumption. The generated impressions may be used to track user preferences and target future secondary media assets toward a user. The impressions may be generated by the media device upon which the secondary media asset is output and may be sent to the central office 103 and/or the application server 107 for further processing.

The application server 107 may generate a database of secondary media asset items associated with the first media asset. For example, all clothing associated with the USA NETWORK® series "Suits" that has a secondary media asset associated therewith may be collected into a searchable database. Some content descriptors from a first manifest file and other content descriptors from a second manifest file may be combined into the database. The database may be searchable by users for objects associated with the secondary media asset items.

While this disclosure references television media, the systems, methods, or apparatuses described herein may be equally applicable to video games, augmented reality, virtual reality, and/or other types of media.

Although examples are described above, the various features and steps may be combined, divided, omitted, rearranged, revised and/or augmented in any desired manner, depending on the specific outcome and/or application. Additional features may be added. Various alterations, modifications, and improvements will readily occur to those skilled in art. Such alterations, modifications, and improvements as are made obvious by this disclosure are intended to be part of this disclosure though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   receiving, by a computing device and during output of a first media asset, a first trick play command to skip an additional media asset;
   receiving a second trick play command during the output of the first media asset;
   determining, based on the additional media asset, a secondary media asset;
   determining a spatial location, in the first media asset, that is associated with a time of the second trick play command; and
   causing concurrent output of the secondary media asset and the first media asset, wherein a position of the secondary media asset is based on the spatial location.

2. The method of claim 1, wherein the additional media asset is a portion of the first media asset.

3. The method of claim 1, wherein the additional media asset is an advertisement.

4. The method of claim 1, further comprising:
   retrieving, based on a comparison of the time of the second trick play command with start and end times associated with the secondary media asset, the secondary media asset.

5. The method of claim 1, wherein the secondary media asset and the additional media asset are parts of a larger media asset.

6. The method of claim 1, further comprising:
   determining, based on the additional media asset, a plurality of secondary media assets; and
   determining, based on priority information associated with the plurality of secondary media assets, a priority of outputting one or more of the plurality of secondary media assets.

7. The method of claim 1, further comprising:
   recording, for a user device and based on the concurrent output of the secondary media asset and the first media asset, an impression associated with the secondary media asset; and
   determining, based on the recorded impression, a future secondary media asset associated with the user device.

8. An apparatus comprising:
   one or more processors; and
   memory storing instructions that, when executed by the one or more processors, cause the apparatus to:
      receive, during output of a first media asset, a first trick play command to skip an additional media asset;
      receive a second trick play command during the output of the first media asset;
      determine, based on the additional media asset, a secondary media asset;
      determine a spatial location, in the first media asset, that is associated with a time of the second trick play command; and
      cause concurrent output of the secondary media asset and the first media asset, wherein a position of the secondary media asset is based on the spatial location.

9. The apparatus of claim 8, wherein the additional media asset is a portion of the first media asset.

10. The apparatus of claim 8, wherein the additional media asset is an advertisement.

11. The apparatus of claim 8, wherein the instructions, when executed by the one or more processors, cause the apparatus to:
    retrieve, based on a comparison of the time of the second trick play command with start and end times associated with the secondary media asset, the secondary media asset.

12. The apparatus of claim 8, wherein the secondary media asset and the additional media asset are parts of a larger media asset.

13. The apparatus of claim 8, wherein the instructions, when executed by the one or more processors, cause the apparatus to:
    determine, based on the additional media asset, a plurality of secondary media assets; and
    determine, based on priority information associated with the plurality of secondary media assets, a priority of outputting one or more of the plurality of secondary media assets.

14. The apparatus of claim 8, wherein the instructions, when executed by the one or more processors, cause the apparatus to:
    record, for a user device and based on the concurrent output of the secondary media asset and the first media asset, an impression associated with the secondary media asset; and
    determine, based on the recorded impression, a future secondary media asset associated with the user device.

15. One or more non-transitory computer-readable media storing instructions that, when executed by one or more processors, cause:
    receiving, during output of a first media asset, a first trick play command to skip an additional media asset;
    receiving a second trick play command during the output of the first media asset;
    determining, based on the additional media asset, a secondary media asset;
    determining a spatial location, in the first media asset, that is associated with a time of the second trick play command; and
    causing concurrent output of the secondary media asset and the first media asset, wherein a position of the secondary media asset is based on the spatial location.

16. The one or more non-transitory computer-readable media of claim 15, wherein the additional media asset is a portion of the first media asset.

17. The one or more non-transitory computer-readable media of claim 15, wherein the additional media asset is an advertisement.

18. The one or more non-transitory computer-readable media of claim 15, wherein the instructions, when executed by the one or more processors, cause:
    retrieving, based on a comparison of the time of the second trick play command with start and end times associated with the secondary media asset, the secondary media asset.

19. The one or more non-transitory computer-readable media of claim 15, wherein the secondary media asset and the additional media asset are parts of a larger media asset.

20. The one or more non-transitory computer-readable media of claim 15, wherein the instructions, when executed by the one or more processors, cause:
    determining, based on the additional media asset, a plurality of secondary media assets; and determining, based on priority information associated with the plurality of secondary media assets, a priority of outputting one or more of the plurality of secondary media assets.

21. The one or more non-transitory computer-readable media of claim 15, wherein the instructions, when executed by the one or more processors, cause:

recording, for a user device and based on the concurrent output of the secondary media asset and the first media asset, an impression associated with the secondary media asset; and determining, based on the recorded impression, a future secondary media asset associated with the user device.

22. A system comprising:

a first computing device; and a second computing device, wherein the first computing device comprises:

one or more first processors; and first memory storing first instructions that, when executed by the one or more first processors, cause the first computing device to:

receive, during output of a first media asset, a first trick play command to skip an additional media asset;

receive a second trick play command during the output of the first media asset;

determine, based on the additional media asset, a secondary media asset;

determine a spatial location, in the first media asset, that is associated with a time of the second trick play command; and cause concurrent output of the secondary media asset and the first media asset, wherein a position of the secondary media asset is based on the spatial location, and wherein the second computing device comprises:

one or more second processors; and second memory storing second instructions that, when executed by the one or more second processors, cause the second computing device to:

send the first trick play command.

23. The system of claim 22, wherein the additional media asset is a portion of the first media asset.

24. The system of claim 22, wherein the additional media asset is an advertisement.

25. The system of claim 22, wherein the first instructions, when executed by the one or more first processors, cause the first computing device to:

retrieve, based on a comparison of the time of the second trick play command with start and end times associated with the secondary media asset, the secondary media asset.

26. The system of claim 22, wherein the secondary media asset and the additional media asset are parts of a larger media asset.

27. The system of claim 22, wherein the first instructions, when executed by the one or more first processors, cause the first computing device to:

determine, based on the additional media asset, a plurality of secondary media assets; and determine, based on priority information associated with the plurality of secondary media assets, a priority of outputting one or more of the plurality of secondary media assets.

28. The system of claim 22, wherein the first instructions, when executed by the one or more first processors, cause the first computing device to:

record, for a user device and based on the concurrent output of the secondary media asset and the first media asset, an impression associated with the secondary media asset; and determine, based on the recorded impression, a future secondary media asset associated with the user device.

* * * * *

UNITED STATES PATENT AND TRADEMARK OFFICE
CERTIFICATE OF CORRECTION

| | | |
|---|---|---|
| PATENT NO. | : 11,388,484 B2 | Page 1 of 1 |
| APPLICATION NO. | : 17/225837 | |
| DATED | : July 12, 2022 | |
| INVENTOR(S) | : Chapman et al. | |

It is certified that error appears in the above-identified patent and that said Letters Patent is hereby corrected as shown below:

In the Drawings

Sheet 4 of 10, Fig. 4, Reference Numeral 410, Line 1:
Delete "SECONARY" and insert --SECONDARY-- therefor Sheet 9 of 10, Fig. 12, Reference Numeral 1218, Line 1:
Delete "SECONARY" and insert --SECONDARY-- therefor Sheet 9 of 10, Fig. 12, Reference Numeral 1220, Line 1:
Delete "RETREIVE" and insert --RETRIEVE-- therefor In the Specification Column 3, Detailed Description, Line 39:
After "command", insert --.-- therefor Column 9, Detailed Description, Line 24:
Delete "15minutes" and insert --15 minutes-- therefor Column 10, Detailed Description, Line 33:
Delete "income<100,000,"" and insert --income<$100,000,"-- therefor Column 10, Detailed Description, Line 65:
After "etc.)", insert --.-- therefor Column 12, Detailed Description, Line 20:
After "command)", insert --.-- therefor Column 14, Detailed Description, Line 21:
After "command)", insert --.-- therefor Signed and Sealed this
Fifth Day of September, 2023

Katherine Kelly Vidal
*Director of the United States Patent and Trademark Office*